July 28, 1931.  C. D. McLEAN  1,815,927
INCUBATOR
Original Filed Feb. 23, 1924  3 Sheets-Sheet 1

INVENTOR.
Charles D. McLean
BY Parker & Burton
ATTORNEY.

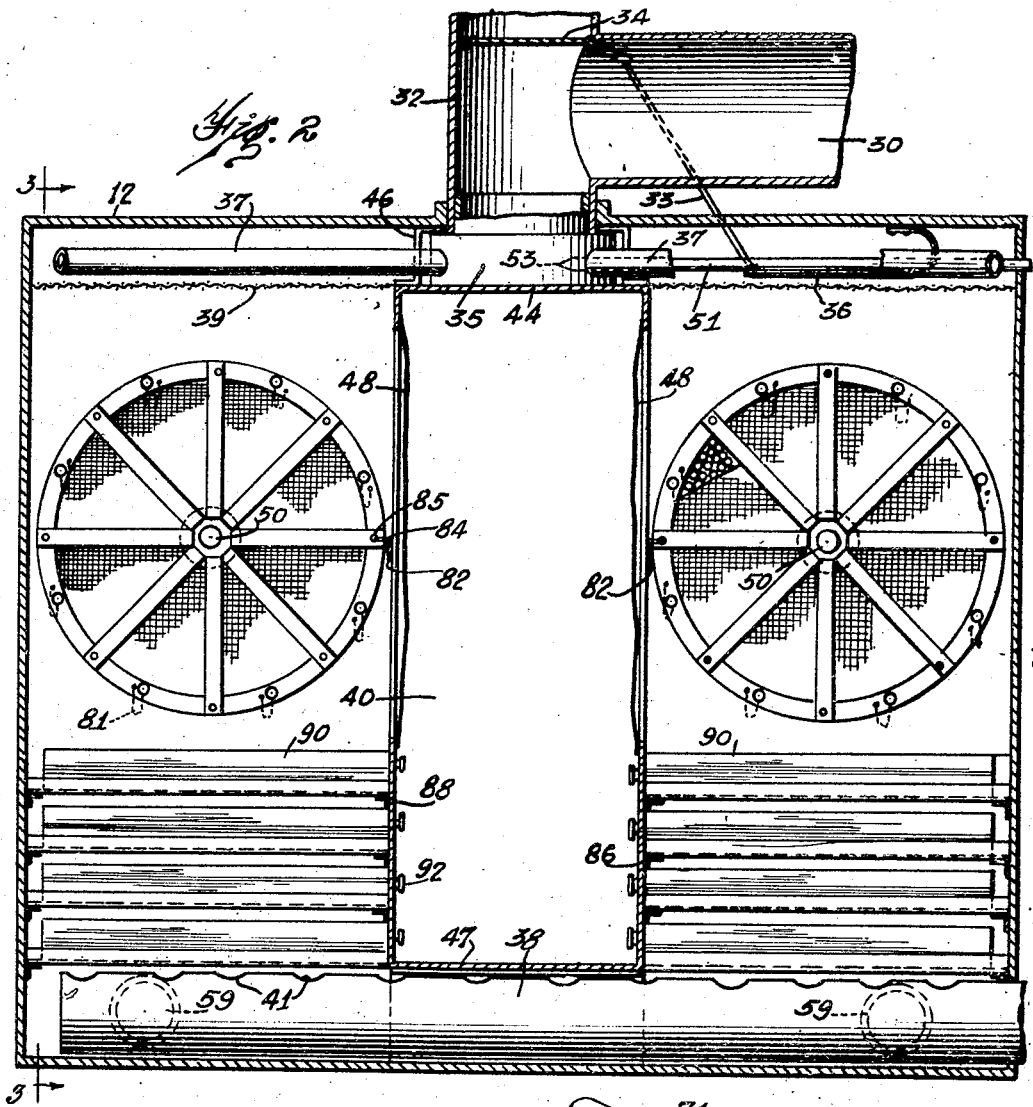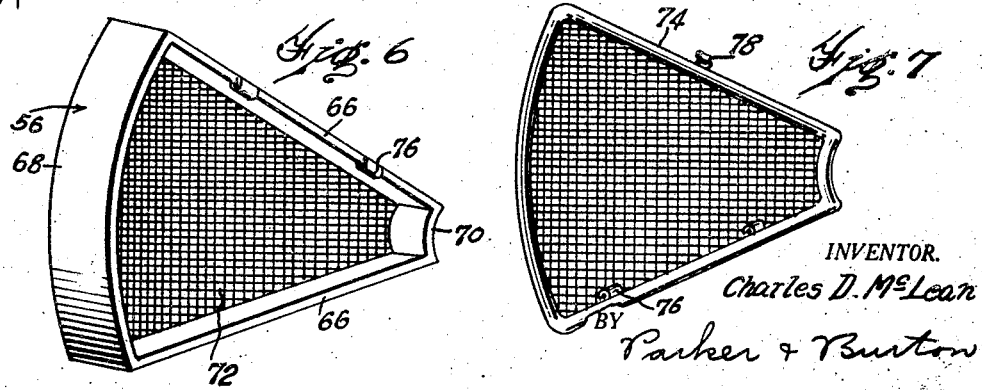

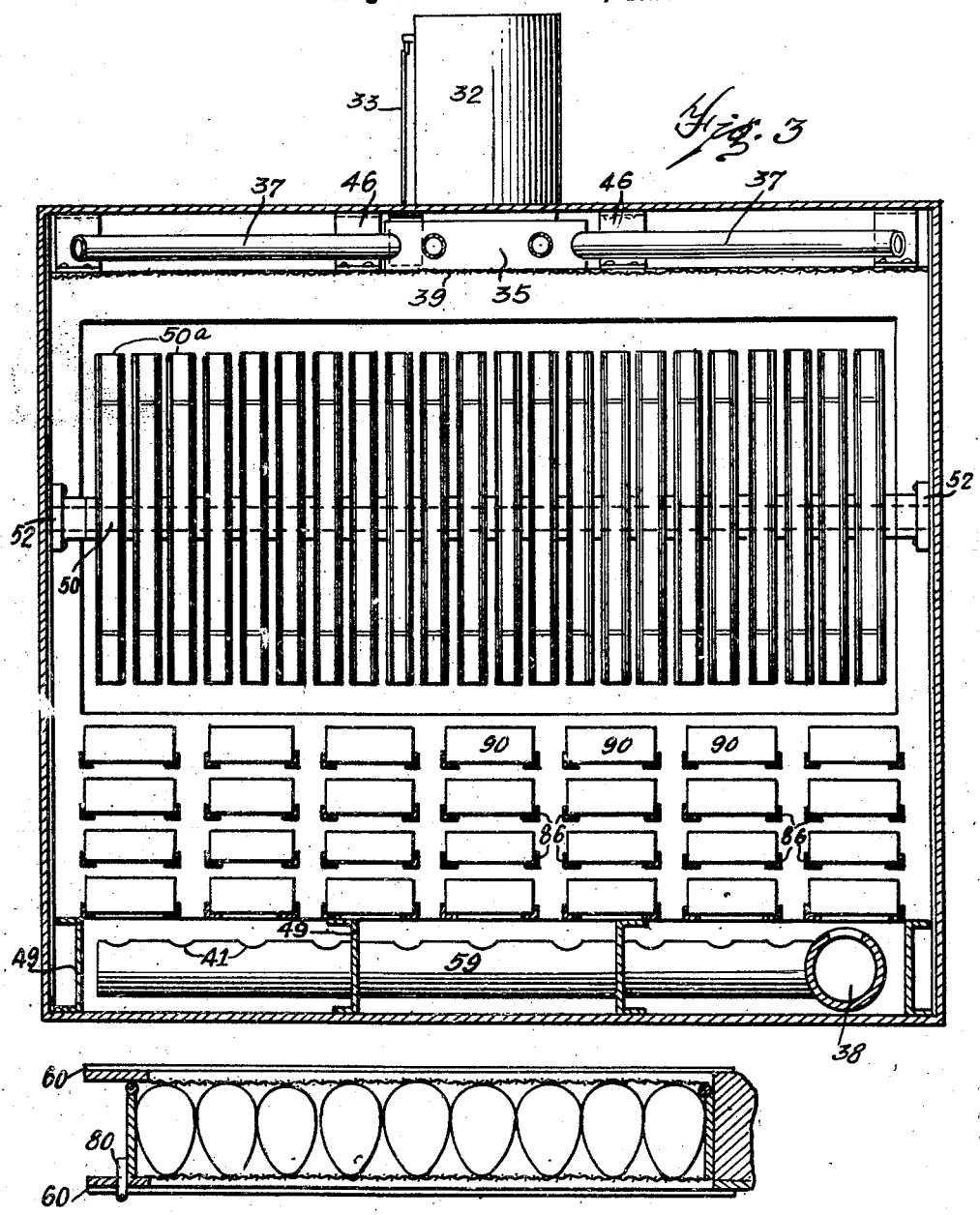

Patented July 28, 1931

1,815,927

UNITED STATES PATENT OFFICE

CHARLES D. McLEAN, OF FENTON, MICHIGAN

INCUBATOR

Original application filed February 23, 1924, Serial No. 694,482. Divided and this application filed March 14, 1924. Serial No. 699,163.

My invention relates to improvements in incubators, and the object is to suitably provide for the incubation of the maximum number of eggs in the minimum amount of space.

A paramount object is to provide apparatus of the above character easily accessible for installation or removal of the eggs as desired and which apparatus is so constructed as to permit rapid turning of the eggs from one side to the other.

I also provide for the accommodation of the maximum number of eggs in the minimum amount of space in such a manner as to permit free circulation of air throughout the incubation chamber over the eggs, and I prefer to so construct and arrange the egg supporting trays as to cause the fresh air entering the chamber to circulate first over the eggs in the less advanced stages of incubation and therefrom to the eggs in the more advanced stage of incubation.

This application particularly relates to the egg-supporting apparatus and such apparatus as here shown is adapted for use in connection with my improved process of hatching eggs more particularly described and claimed in my co-pending application, Serial No. 694,482 filed Feb. 23, 1924.

In the drawings,—

Fig. 2 is a vertical sectional view through an incubation chamber embodying my improvement.

Fig. 3 is a vertical sectional view through the incubation chamber shown in Fig. 2, taken on line 3—3 thereof.

Fig. 6 is a perspective of one of the egg-carrying racks.

Fig. 7 is an elevation of a rack cover.

Fig. 8 is a sectional view through one of the egg racks.

Figure 1:
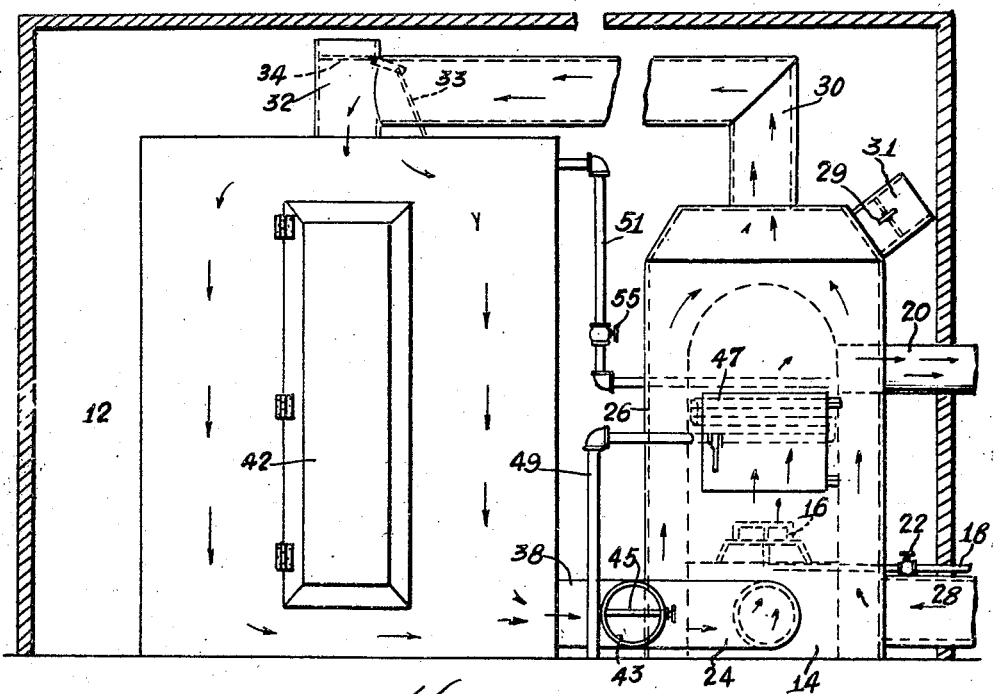
Figure 1 is a side elevation of an incubation assembly suitable for use with and embodying my improved apparatus.
Figure 5:
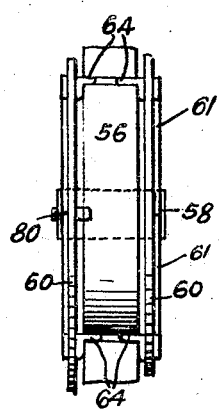
Fig. 5 is a side elevation of the drum shown in Fig. 4.

The invention herein described pertains to the egg-supporting apparatus and is illustrated as embodied in a structure particularly adapted for use in conjunction with the process and general apparatus described and claimed in my above referred to co-pending application.

In the drawings, the incubation chamber is indicated as 12. I provide a heating plant 14 which is shown in the form of a hot air furnace and which is provided with a burner 16 having a fuel inlet 18, a flue for exhaust gases 20 and control mechanism 22 to regulate the rate of combustion. The burner has an air draft 24 which leads from the incubation chamber to draw air therefrom. The heating plant has an air jacket 26 provided with a fresh air inlet 28 and an outlet 30 for heated air, which outlet leads to the incubation chamber.

An auxiliary outlet for heated air 31 is provided. This outlet is controlled by a damper 29.

I have shown the incubation chamber as provided with an atmospheric air inlet 32 which is normally closed by a valve 34. The valve 34 is controlled by a thermostat 36. This thermostat is disposed to respond to atmospheric changes within the incubation chamber having linkage 33 to operate the valve 34 when the temperature within the chamber rises beyond a predetermined point. The valve 34 normally closes the atmospheric inlet 32 to admit air to flow freely through the heated air inlet 30 but to prevent admission of atmospheric temperature air to the incubation chamber. Opening of valve 34 admits atmospheric air to the incubation chamber and at the same time serves to restrict the flow of heated air thereto. By this means I am able to control the temperature of the air within the incubation chamber.

The heated air inlet to the incubation chamber is provided with a manifold 35 having a plurality of outlets 37 which lead to separated points within the top of the chamber to distribute heated air throughout the chamber, and in order to prevent the formation of dead air spaces and draft channels I prefer to employ a baffle screen 39 stretched across the chamber below the heated air outlet, which screen may be made of fabric such as cheese-cloth.

In order to provide for a circulation of fresh heated air through the chamber I provide an air passageway 38 extending from the chamber to the air intake 24 to the burner. This air passageway communicates with the interior of the chamber by means of extensions 59 which extend along the bottom of the chamber at each side and are provided with a plurality of air intake openings 41. By this means I draw air from the bottom of the chamber to feed the burner and the air is drawn therefrom in response to the requirements of the burner, and I regulate the rate of withdrawal by regulating the rate of combustion in the burner.

The fresh heated air entering the chamber at the top is drawn therethrough over the eggs disposed therein and out of the chamber at the bottom, and a steady circulation of fresh heated air is maintained throughout the incubation chamber over the eggs. The air passageway 38 is provided with an atmospheric inlet 43 controlled by a manually operable damper 45 to admit atmospheric air to the burner.

I provide a steam coil 47 disposed so as to be heated by the burner, which coil has a water inlet 49 and a steam outlet 51. This outlet terminates within the manifold 35 in the incubation chamber in a nozzle 53 adapted to project a jet of steam into the air into the manifold. The passage of steam through the outlet may be manually controlled by a suitable hand valve 55.

I have illustrated my invention in association with a large incubation chamber. Obviously it might be employed in a much smaller chamber. In the large chamber in which I have shown it as being used the chamber is provided with a central corridor 40 which is simply a working space between the two sides of the chamber in which the eggs are arranged. Entrance is obtained in this corridor by a door 42. The corridor is provided with a ceiling 44 supported from the ceiling of the incubation chamber by brackets 46 and has a floor 47 carried by supports 49. Curtains 48 hang from the ceiling at each side. The walls of the incubation chamber are of suitable material to preserve the temperature within the chamber.

I have described in my co-pending application above noted my improved process of egg incubation and the operation of the apparatus used in its accomplishment and above referred to. This particular application concerns the egg-supporting apparatus hereinafter described.

On each side of the corridor extending longitudinally thereof I provide a dead axle or shaft 50. This shaft is mounted upon end supports 52. The shaft carries a plurality of rotatable drums 50a. I have shown these drums as adapted for independent rotation and capable of being independently locked at different points in their rotation.

Figure 4:
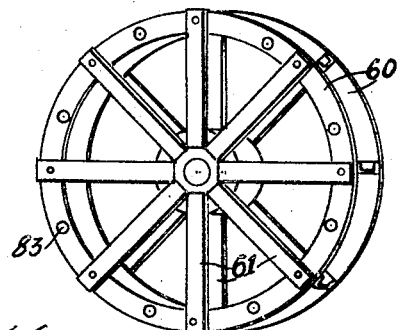
Fig. 4 is a perspective of one of the rotatable drums.

In Fig. 4 I have illustrated one of these drums. The drum is provided with a hub 58 which has a bearing upon the shaft. The drum has a pair of opposed spaced-apart rim members 60. These rim members are supported from the hub by a plurality of pairs of radially-extending spokes 61. These spokes are provided with flanges 64 which serve as supports for removable trays 56.

In Figs. 6 and 7 I show a single tray with its provided removable cover. Each tray is in the form of a sector of the drum. The enlarged end 68 of the tray is in the form of an arc of a circle adapted to fit between the opposed rim members 60 of the drum and the tray has side walls 66 which extend from the end 68 to a small arcuate end portion 70 which is adapted to abut the hub 58 of the drum. The tray is provided with a screen mesh bottom 72 and a removable cover 74 also of screen of suitable mesh is detachably pivotally connected with the tray by means of hinges 76. These hinges comprise detachable sections so as to permit complete removal of the cover from the tray. A catch 78 is provided by means of which the cover may be fastened to the tray.

The tray is filled with eggs standing on end between the screen cover and the screen bottom. The tray is then inserted in the drum between successive pairs of the radially-extending tray supports. I have provided a pin 80 secured to the drum by a cord 81 which pin is adapted to extend through an aperture 83 in the rim of the drum outside of the end of the tray to hold the tray in place in the drum. In the working out of my process such number of trays or drums as is desired may be filled with eggs.

It is necessary to turn the eggs from time to time and this is accomplished by rotating the drum upon the shaft 50. The eggs should be turned from one side to the other and I, therefore, have provided means to fasten the drum against rotation after it has been rotated through an arc of 180 degrees. A bar 82 extends longitudinally of the incubation chamber in proximity the several drums. Catches 84 are pivoted to this bar at intervals. These catches are adapted to be moved into recesses 85 formed in the drum rim to secure the drum against rotation.

When the eggs are placed in the incubation chamber they are first placed in the trays in the drums. During the later stages of incubation I remove the eggs from the drum trays and place them in egg-supporting drawers 90. A plurality of these drawers are provided below the drums. These drawers are preferably open top screen mesh drawers supported upon drawer slides 86. These slides are secured at one end to the wall of the chamber and at the opposite end to the frame-work 88 which extends upwardly from the floor 47 of the central corridor. Each drawer may be provided with a handle 92 and the drawers are disposed one above the other so that the bottom of one drawer serves as a top for the drawer immediately therebelow.

What I claim is:

1. In an incubator, an incubation chamber having a working corridor and a space along one side of said corridor within which are mounted a plurality of axially spaced-apart individually rotatable egg-carrying drums having open sides and each of a width to carry a single layer of eggs.

2. An incubation chamber provided with a rotatable drum having spaced-apart radially-extending supports adapted to receive sector-shaped egg-carrying racks, and a plurality of sector-shaped egg-carrying racks independently removably disposed upon said supports, each rack being of a width to contain a single tier of eggs.

3. An incubation chamber provided with a plurality of independently rotatably supported egg-carrying drums arranged in a row, each drum being of a width to contain a single tier of eggs, said drums being axially spaced apart to permit of air circulation between adjacent drums, and locking means for securing the drums at adjusted positions of rotation.

In testimony whereof, I sign this specification.

CHARLES D. McLEAN.